United States Patent
Hakeem et al.

(10) Patent No.: US 9,550,528 B1
(45) Date of Patent: Jan. 24, 2017

(54) LANE CHANGE NEGOTIATION

(71) Applicant: Ford Global Technologies, LLC, Dearborn, MI (US)

(72) Inventors: Mohannad Hakeem, Dearborn, MI (US); Samer Abbas, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/853,193

(22) Filed: Sep. 14, 2015

(51) Int. Cl.
*B62D 15/02* (2006.01)
*B60R 1/00* (2006.01)
*B60Q 1/34* (2006.01)

(52) U.S. Cl.
CPC ............ *B62D 15/025* (2013.01); *B60Q 1/346* (2013.01); *B60R 1/00* (2013.01); *B60R 2300/8093* (2013.01)

(58) Field of Classification Search
CPC . B62D 15/025; B60R 1/00; B60R 2300/8093; B60Q 1/346
USPC ........................................................ 701/41
See application file for complete search history.

(56) References Cited

U.S. PATENT DOCUMENTS

| | | | |
|---|---|---|---|
| 6,882,287 B2 | 4/2005 | Schofield | |
| 8,428,843 B2 | 4/2013 | Lee et al. | |
| 2010/0214085 A1* | 8/2010 | Avery | G08G 1/161 340/435 |
| 2013/0151412 A1 | 6/2013 | Spahl et al. | |
| 2013/0184926 A1* | 7/2013 | Spero | B62D 1/28 701/26 |
| 2014/0207325 A1 | 7/2014 | Mudalige et al. | |
| 2015/0081202 A1 | 3/2015 | Levin | |

OTHER PUBLICATIONS

Honda to Showcase New Connected Car and Automated Driving Technologies at 2014 ITS World Congress in Detroit—Honda.com (2 pages).

* cited by examiner

*Primary Examiner* — Anne M Antonucci
(74) *Attorney, Agent, or Firm* — Frank MacKenzie; Bejin Bieneman PLC

(57) ABSTRACT

A vehicle computer is programmed to: receive data from the first vehicle sensor indicating at least one signal from a second vehicle. The computer is further programmed to determine that the signal is a permission for the first vehicle to change lanes, and to actuate a change of lane of travel of the first vehicle.

20 Claims, 4 Drawing Sheets

LANE CHANGE NEGOTIATION

BACKGROUND

Changing lanes requires an awareness of the other vehicles on the road, and is often desirable while driving. However, safe and effective lane changing can be a problem for current vehicles. For example, a first vehicle wishing to change lanes may have difficulty knowing the intent of surrounding vehicles. Likewise, the first vehicle may be unaware of surrounding vehicles' intentions. These uncertainties can make changing lanes hazardous and difficult.

DRAWINGS

DETAILED DESCRIPTION

Introduction

Figure 1:
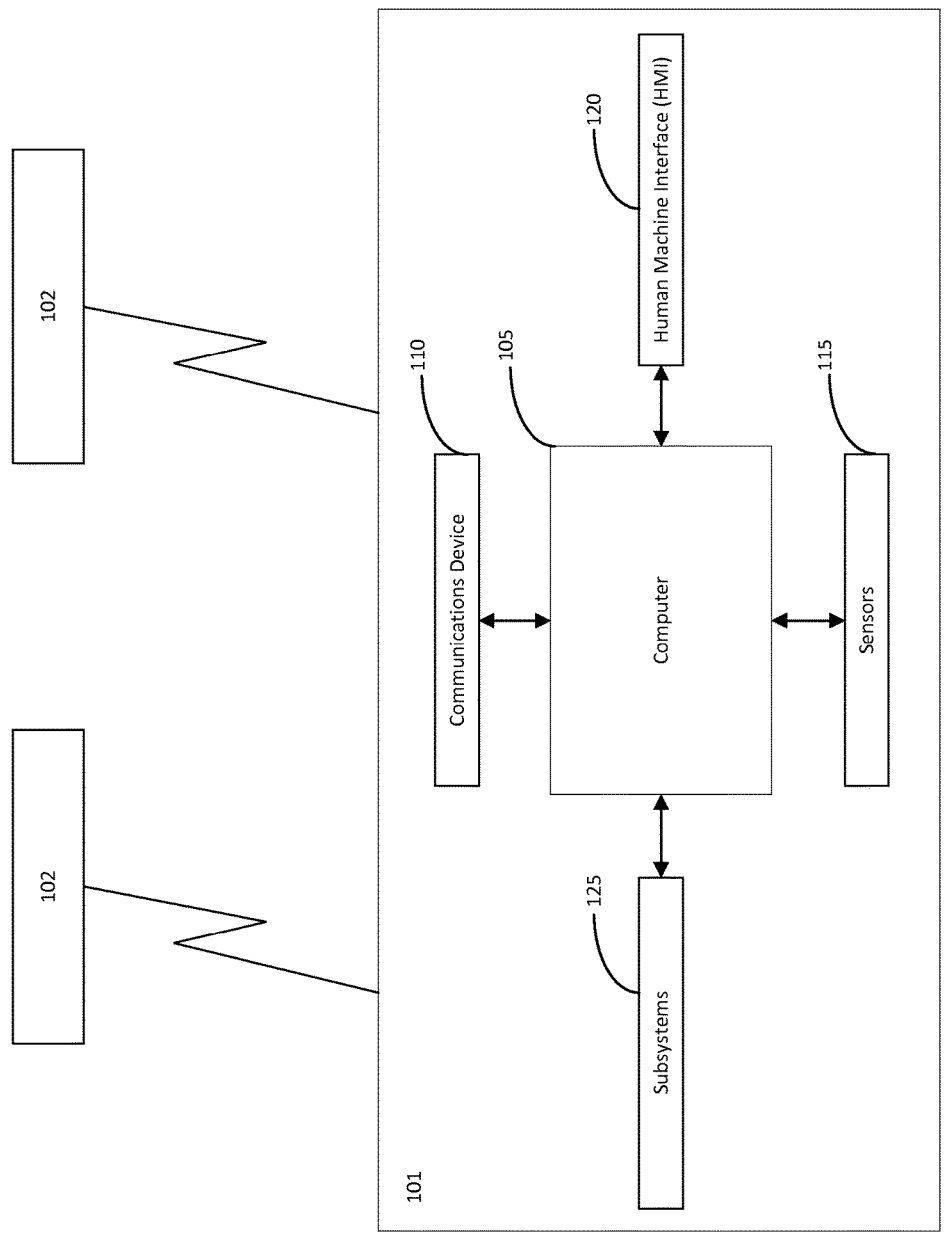
FIG. 1 illustrates an exemplary vehicle system for operating a vehicle according to visual signals and kinematic data.

FIG. 1 is a block diagram of an exemplary vehicle system for controlling lane changes for a first vehicle 101. The first vehicle 101 may include a computer 105 that includes or is communicatively coupled to a transceiver 110, sensors 115, a human machine interface (HMI) 120, and/or vehicle 101 subsystems 125, e.g., steering, brakes, throttle, etc. The computer 105 may receive and control data relating to operating the first vehicle 101 and/or determining whether to make a change or adjustment to a mode of operating the vehicle 101, such as changing lanes as disclosed herein.

For example, the sensors 115 of the first vehicle 101 may detect at least one visual signal, e.g., a turn signal 135, flashing headlights 140, etc., from a second vehicle 102. The computer 105 of the first vehicle 101 may decode the detected visual signal and determine that the visual signal is a permission for the first vehicle 101 to change lanes. The HMI 120 of the first vehicle 101 may represent to an occupant that the computer 105 is considering the lane change and/or the status of the lane change. The computer 105 may actuate the change of lane of travel if it determines that it is safe and/or efficient to do so. The computer 105 may communicate with the subsystems 125 of the first vehicle 101 to actuate the lane change, e.g., provide instructions to steering and throttle controllers.

Alternatively or additionally, the sensors 115 of a first vehicle 101, may detect at least one visual signal from a second vehicle 102. The computer 105 of the first vehicle 101 may decode the detected visual signal and may determine that the visual signal represents a request for the second vehicle 102 to change lanes. The communications device 110 of the first vehicle 101 may send a message, e.g., using RF communications to the second vehicle 102 requesting the permission to change lanes. Upon receiving the permission to change lanes, the second vehicle 102 may actuate the change of lane based at least in part on the permission.

Exemplary System Elements

The system 100 includes at least one first vehicle 101 and at least one second vehicle 102. For ease of description, certain elements are described herein with respect to the first vehicle 101, and certain steps, processes, etc., are described from the perspective of the first vehicle 101, but it is to be understood that such elements, steps, processes, etc. may also, and likely will, be present in the second vehicle 102 in the system 100.

The first vehicle 101 may include a computer 105. The computer 105 may be communicatively coupled to or include one or more electronic control units, e.g., controllers or the like included in the vehicle 101 for monitoring and/or controlling various vehicle components, e.g., an engine control unit (ECU), transmission control unit (TCU), etc. The computer 105 may be generally configured for communications on a controller area network (CAN) bus or any other suitable protocol such as JASPAR, LIN, SAE J1850, AUTOSAR, MOST, etc. Electronic control units may be connected to, e.g., the CAN bus, as is known. The vehicle 101 may also include one or more electronic control units specifically for receiving and transmitting diagnostic information such as an onboard diagnostics connector (OBD-II). Via the CAN bus, OBD-II, and/or other wired or wireless mechanisms, the computer 105 may transmit messages to various devices in a vehicle and/or receive messages from the various devices, e.g., controllers, actuators, etc. Alternatively or additionally, in cases where the computer 105 actually comprises multiple devices, the CAN bus or the like may be used for communications between devices represented as the computer 105 in this disclosure, e.g., various ECUs.

The first vehicle may include a communications device 110. The communications device 110 may transmit and/or receive messages to and/or from the first vehicle 101. The communications device 110 may transmit and/or receive messages using a plurality of communication protocols. For example, the communications device 110 may transmit and/or receive messages using protocols such as Dedicated Short Range Communication (DSRC), cellular modem, and short-range radio frequency. The communications device 110 may be in communication with the computer 105, such that the computer 105 can process the message transmission and/or receipt by the communications device 110.

The communications device 110 may transmit and/or receive kinematic data, i.e., data relating to motion, regarding vehicles surrounding the first vehicle 101. For example, the kinematic data may include the velocity of each of the vehicles surrounding the first vehicle 101, including the velocity of the second vehicle 102. The kinematic data may further include an acceleration, a steering angle, and a path history of the vehicles surrounding the first vehicle 101.

The communications device 110 may communicate with a network that extends outside of the first vehicle 101, e.g., communicating with a remote server. The network may include various wired and/or wireless networking technologies, e.g., cellular, Bluetooth, wired and/or wireless packets, etc. The network may have any suitable topology, e.g., bus, point-to-point, hybrid, etc. Exemplary communication networks include wireless communication networks (e.g., using Bluetooth, IEEE 802.11, etc.), local area networks (LAN), and/or wide area networks (WAN), including the Internet, providing data communication services.

The first vehicle 101 may include a variety of sensors 115. The sensors 115 may be linked to electronic control units and operate within a CAN bus protocol or any other suitable protocol, as described above. The sensors 115 may both transmit and receive data. The sensors 115 may communicate with the computer 115 or other electronic control unit via e.g., the CAN bus protocol, to process information transmitted from or received by the sensors 115. The sensors 115 may communicate with the computer 105 or other electronic control unit via any suitable wireless and/or wired manner. The sensors 115 may include any assortment of a camera, a RADAR unit, a LADAR unit, a sonar unit, a breathalyzer, a motion detector, etc. Additionally, the sensors 115 may include a global positioning system (GPS) receiver that may communicate with a global positioning system satellite connected to the network, etc.

The sensors 115 may be used to measure a visual signal and/or the kinematic data of the first vehicle 101 and of the vehicles surrounding the first vehicle 101. For example, the sensors 115 may measure a distance between the first vehicle 101 and the second vehicle 102 or between the first vehicle 101 and any other suitable vehicles and/or objects. The sensors may measure any measurable condition or state of at least one of the first vehicle 101, the second vehicle 102, and any other suitable vehicles and/or objects.

For example, the sensors 115 of the first vehicle 101 may be used to assess whether the second vehicle 102 permits the first vehicle 101 to change lanes. The second vehicle 102 may communicate to the first vehicle 101 the permission to change lanes by sending the visual signals from, e.g., a headlight 140 and/or a turn signal 135 of the second vehicle 102. The second vehicle 102 may additionally communicate to the first vehicle 101 the kinematic data and other operational data of the second vehicle 102 in conjunction with communicating the visual signals. The first vehicle 101 may process the visual signals and/or the kinematic data from the second vehicle 102 using the computer of the first vehicle 101 to decide whether to actuate the lane change.

The computer 105 may include one or more memory devices. The memory device may include a main memory device, i.e., a volatile memory device, and/or an auxiliary storage device that may be internal or external to the rest of the computer, e.g., an external hard drive. The memory device may communicate with the computer 105 and may store the data transmitted over the CAN bus protocol by the electronic control units. Individual data may be collected by the sensors 115, but subsequently, the aggregate data may be processed together by the computer 105. Data may also include data calculated and processed as an output by the computer 105. In general, data may include any data that may be gathered by a sensor 115 and/or processed by the computer 105.

The first vehicle 101 may include a human machine interface (HMI) 120. The HMI 120 may allow an occupant of the first vehicle 101 to interface with the computer 105, with electronic control units, etc. For example, the HMI 120 may display the status or progress of the lane change or of the communications with the second vehicle 102. The HMI 120 may include any one of a variety of computing devices including a processor and a memory, as well as communications capabilities. The HMI 120 may be a portable computer, tablet computer, mobile phone, e.g., a smart phone, etc., that includes capabilities for wireless communications using IEEE 802.11, Bluetooth, and/or cellular communications protocols, etc. The HMI 120 may further include interactive voice response (IVR) and/or a graphical user interface (GUI), including e.g., a touchscreen or the like, etc.

The HMI 120 may communicate with the network that extends outside of the first vehicle 101 and may communicate directly with the computer 105, e.g., using Bluetooth, etc.

The first vehicle 101 may include one or more subsystems 125. The subsystems 125 may include a brake system, a suspension system, a steering system, and a powertrain system. The subsystems may communicate with the computer 105, e.g., through the electronic control units and/or via the CAN bus protocol. The subsystems 125 may transmit and/or receive data from the computer 105, the sensors 115, the communications device 110, and/or the HMI 120. For example, the occupant may modify the lane change by communicating a preference using the HMI 120 for receipt by the subsystems 125.

Exemplary Process Flows

Figure 3:
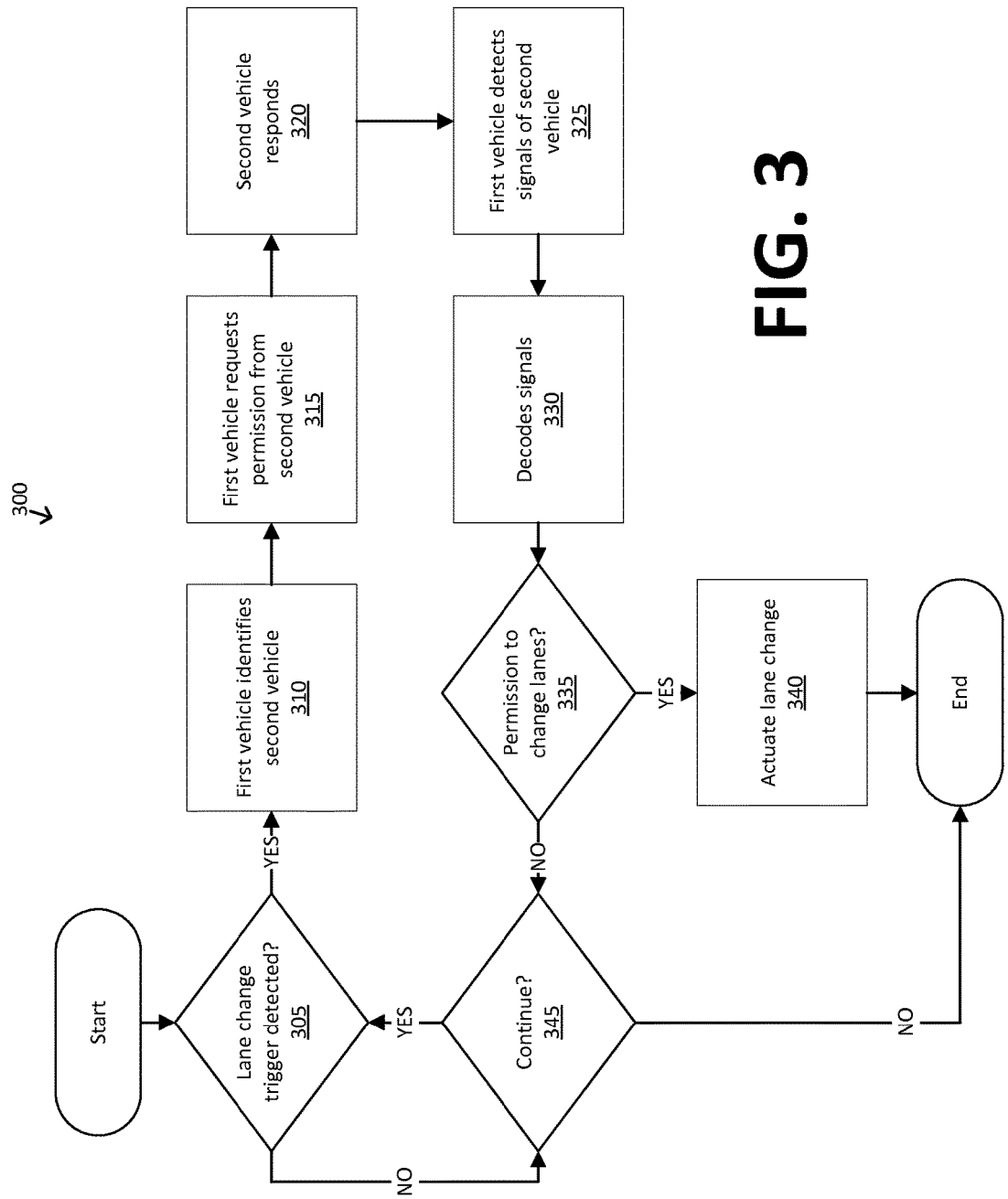
FIG. 3 is a diagram of an exemplary process that may be implemented in the computer of a first vehicle for requesting permission from a second vehicle for the first vehicle to change lanes.

FIG. 3 is a diagram of an exemplary process 300 that may be implemented in the computer 105 of a first vehicle 101 for requesting permission from a second vehicle 102 for the first vehicle 101 to change lanes.

The process 300 begins in a block 305, in which the computer 105 of the first vehicle 101 determines if a lane change trigger is detected. A lane change trigger means an indication that the vehicle 101 could or should change lanes. A lane change trigger may be detected according to predetermined values of one of more vehicle 101 parameters. For example, a lane change trigger may be detected upon a determination that changing the lane of travel of the first vehicle 101 is necessary to allow the vehicle 101 to maintain a current speed, avoid an obstacle, and/or increase speed where a current speed is below a threshold (e.g., a speed limit for a road), etc. Accordingly, a lane change trigger may be generated based on one or more of data concerning operation of the vehicle 101, e.g., speed, acceleration, etc., data regarding an environment surrounding the first vehicle 101, e.g., traffic data defined as a number of cars passing a location over a period of time, kinematic data of surrounding vehicles 102, etc.

Figure 2:
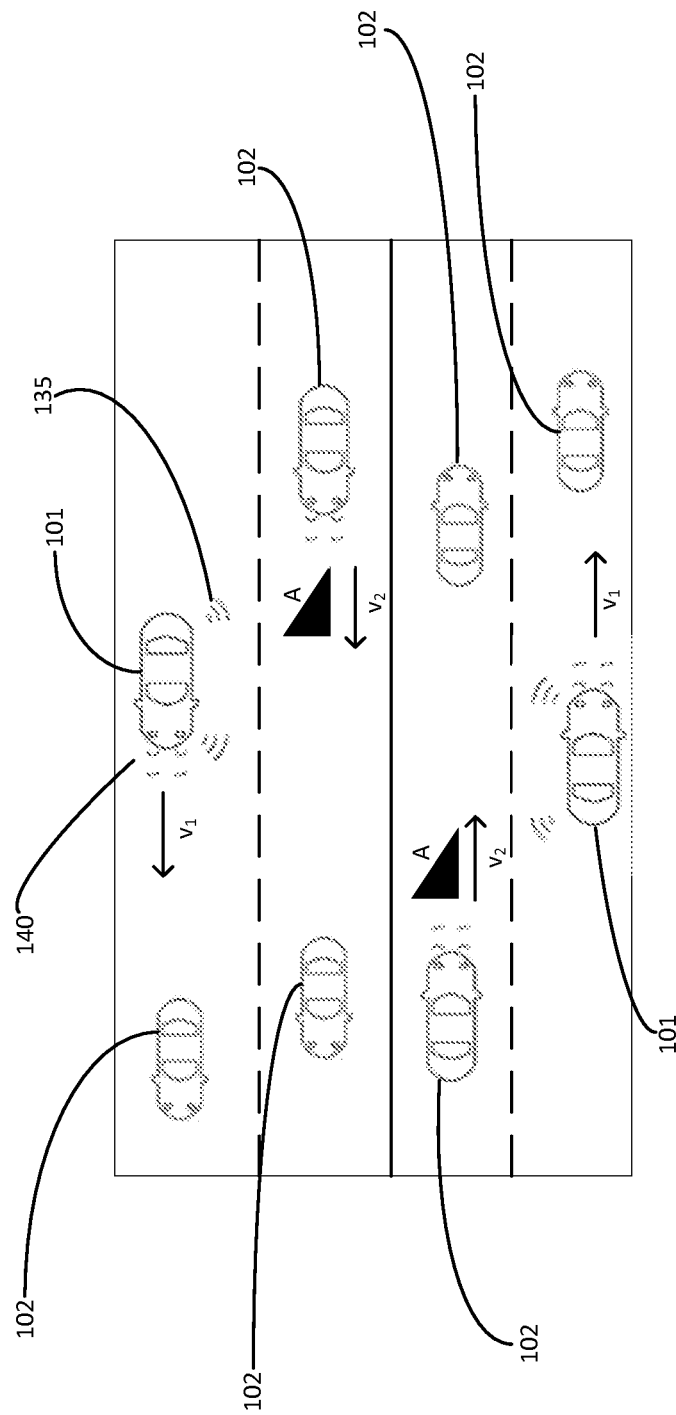
FIG. 2 is a schematic diagram illustrating two examples of using visual signals and vehicle-to-vehicle data to actuate a lane change.

On one example of determining a lane change trigger, the first vehicle 101 travels at a first velocity $v_1$, and a second vehicle 102 travels at a second velocity $v_2$. The computer 105 of the first vehicle 101 receives the first vehicle velocity $v_1$ via the vehicle 101 communications bus, and uses sensor 115 data to measure the velocity $v_2$ of the second vehicle 102, as illustrated in FIG. 2. The computer 105 in this example determines whether the first vehicle 101 is subject to a lane change trigger based, at least in part, on how the second velocity $v_2$ relates to the first vehicle 101 velocity $v_1$. For example, a lane change trigger could be identified where the first velocity $v_1$ of the first vehicle 101 is equal to or greater than the second velocity $v_2$ of the second vehicle 102. On the other hand, if the first velocity $v_1$ is less than the second velocity $v_2$ by more than a predetermined threshold, than a lane change trigger may not exist.

In another example, the second vehicle may have a change of velocity, i.e., acceleration, rate A. The computer 105 of the first vehicle 101 may determine a lane change trigger for the first vehicle 101 based at least in part on the change of velocity rate A. Should the computer 105 of the first vehicle 101 fail to determine a lane change trigger, the process 300 proceeds to a block 345, described below.

If the computer 105 of the first vehicle 101 determines the lane change trigger then, following the block 305, in a block 310, the first vehicle 101 identifies the second vehicle 102 from which to request permission. The identified second vehicle 102 typically is a vehicle 102 involved in determining a lane change trigger as described with respect to the block 305. In general, the first vehicle 101 may identify the second vehicle 102 from a plurality of surrounding vehicles based on the data, e.g., kinematic data, etc., and messages received from the first vehicle 101 sensors 115 and communications device 110. For example, the first vehicle 101 sensors 115 may identify a most proximate second vehicle 102 of the plurality of surrounding vehicles from which to request permission. Alternatively, the first vehicle 101 may identify a most relevant second vehicle 102, i.e., having a travel path that intersects the travel path of the first vehicle 101, of the plurality of surrounding vehicles from which to request permission. The second vehicle 102 may thus be any of a vehicle in the same lane of travel as the first vehicle 101 and a vehicle passing the first vehicle 101, etc.

Next in a block 315, the first vehicle 101 requests lane-change permission from the second vehicle 102. For example, the requested permission may be a request to change lanes into a lane of travel of the second vehicle 102. In some implementations, the first vehicle 101 may request permission from the second vehicle 102 to change lanes into any lane of travel. The request may be made via one or more mechanisms included in the first vehicle 101. For example, the request may take the form of a visual signal, such as a turn signal 135, etc. Alternatively, the request may take the form of any suitable vehicle-to-vehicle based communications protocol, e.g., DSRC, cellular modem, short-range radio frequency, etc.

Following the block 315, in a block 320, the computer 105 of the second vehicle 102 identifies the lane change permission requested in the block 310, and provides a response. The computer 105 of the second vehicle 102 may interpret data received from the first vehicle 101, e.g., by vehicle-to-vehicle communications such as DSRC, from one or more visual signals, etc.

The second vehicle 102 computer 105 may determine whether to grant lane-change permission to the first vehicle 101 according to one or more criteria. For example, the vehicle 102 may include sensors 115 to determine whether other vehicles are present in the lane of travel of the vehicle 102 and. if so, a distance or distances of such other vehicles from the vehicle 102 and/or the vehicle 101. If the vehicle 102 lane of travel is clear within a predetermined distance ahead of and behind the vehicle 102, then the vehicle 102 may grant lane-change permission to the vehicle 101. Additionally or alternatively, the vehicle 102 computer 105 may be programmed to consider a difference between velocities and/or rate of change of velocities of the vehicles 101, 102. For example, if the vehicle 102 might deny lane-change permission where the vehicle 102 velocity exceeded the vehicle 101 velocity by a predetermined threshold. Further possible is that the vehicle 102 could adjust a distance parameter based on a difference in velocities of the vehicles 101, 102. For example, if the vehicle 101 was exceeding the velocity of the vehicle 102 by more than a predetermined threshold, then a first distance threshold or thresholds between the vehicle 102 and the vehicle 101 and/or other vehicles could be used, whereas if the vehicle 101 was slower than the velocity of the vehicle 102 by more than a predetermined threshold, then a second distance threshold or thresholds between the vehicle 102 and the vehicle 101 and/or other vehicles could be used. Other factors that the second vehicle 102 computer 105 could consider could be based on data collected from vehicle 102 sensors 115, e.g., the presence or absence of obstacles detected in a vehicle roadway, a particular lane of travel, etc.

The response of the second vehicle 102 to the requested permission may take any suitable form. For example, the second vehicle 102 may respond by visual signal such as by a pattern in a turn signal 135 or headlights 140, etc. Further, visual signals, in addition to simply indicating permission to change lanes can, e.g., on a multi-lane highway, indicate a specific lane of travel selected from multiple lanes of travel, into which the vehicle 101 is given permission to change lanes. For example, a first pattern of visual signals could indicate that the vehicle 101 may change into a right lane, while a second pattern of visual signals could indicate that the vehicle 101 has permission to change into a left lane.

Alternatively or additionally to visual signals, the second vehicle 102 may respond by changing its velocity. That is, if within a predetermined time after a request is made, e.g., two seconds, five seconds, etc., the first vehicle 101 detected a change of velocity rate A of the second vehicle 102 that is at or above a predetermined threshold, then the first vehicle 101, in one example, interprets such velocity rate A change as a denial of permission for the first vehicle 101 to change lanes. Alternatively, the first vehicle 101 may determine that a detected change of velocity rate A of the second vehicle 102, e.g., at or below a predetermined threshold, indicates permission to change lanes, for example.

Next, in a block 325, the first vehicle 101 detects, e.g., as described above, the response, e.g., a visual signal, change of velocity rate A, etc., of the second vehicle 102.

Next, in a block 330, the first vehicle 101 interprets and/or decodes the response detected in the block 325. For example, the computer 105 of the first vehicle 101 may decode a visual signal. The computer 105 of the first vehicle 101 may receive at least one of a combination of visual signals received by the sensors 115 of the first vehicle 101 and/or of kinematic data received by the communications device 110 of the first vehicle 101 from the second vehicle 102. Visual signals, changes in rates of velocity, etc., may be decoded and/or interpreted as described above.

Following the block 330, in a block 335, the computer 105 of the first vehicle 101 uses the evaluation of the block 330 to determine whether the second vehicle 102 has given the first vehicle 101 permission to change lanes. As explained above, the second vehicle 102 may permit the first vehicle 101 to change lanes into the lane of travel of the second vehicle 102 or into another lane of travel. Alternatively, the second vehicle 102 may deny permission for the first vehicle 101 to change lanes into any lane of travel or into a specific lane of travel. If the computer 105 of the first vehicle 101 determines that the second vehicle 102 has given the first vehicle 101 permission to change lanes, then the process 300 proceeds to a block 340. However, if the computer 105 of the first vehicle 101 determines that the second vehicle 102 denied permission for the first vehicle 101 to change lanes, then the process 300 proceeds to the block 345.

If the computer 105 of the first vehicle 101 determines that the second vehicle 102 has given the first vehicle 101 permission to change lanes, the first vehicle 101, in the block 340, actuates the lane change. For example, the computer 105 may provide instructions to one or more electronic control units (ECUs) in the vehicle 101 to actuate one or more of steering, throttle, etc., to achieve the lane-change. During the lane change, the HMI 120 may display the status or progress of the lane change. The HMI 120 may prompt the occupant and receive input governing parameters of the lane change, e.g., the HMI 120 may allow the occupant to adjust the speed at which the first vehicle 101 actuates the lane change, the HMI 120 may allow the occupant to cancel the lane change, etc.

Following either the block 305 or the block 335, the computer 105 determines in the block 345 whether the process 300 should continue. For example, the process 300 may end if the occupant of the first vehicle 101 turns off the function of the herein described lane change negotiation, if the vehicle is switched off, etc. In any case, if the process 300 should not continue the process 300 ends following the block 345. Otherwise, the process 300 returns to the block 305.

Figure 4:
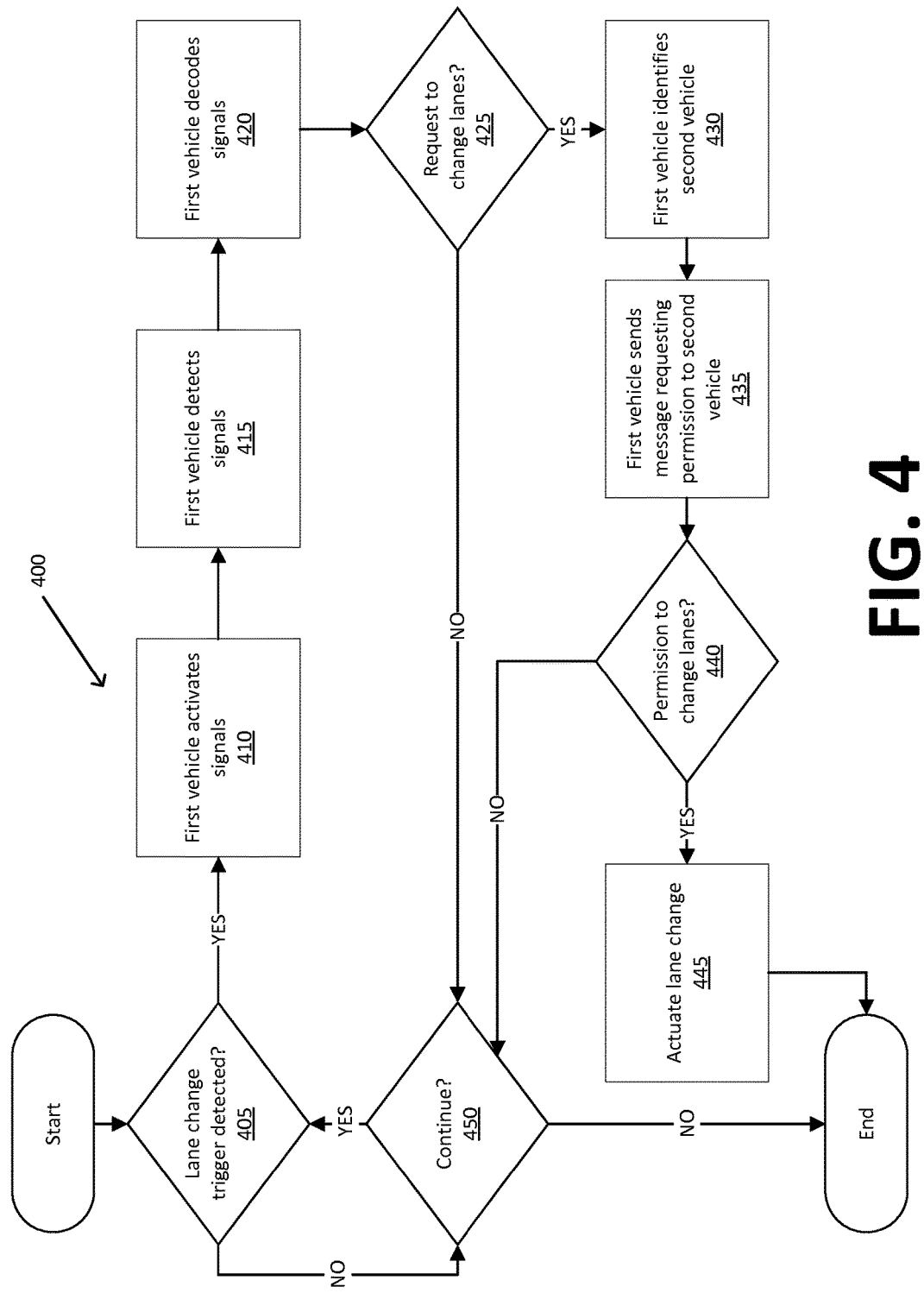
FIG. 4 is a diagram of an exemplary process that may be implemented in the computer of a first vehicle for receiving permission from a second vehicle for the first vehicle to change lanes.

FIG. 4 is a diagram of an exemplary process 400 that may be implemented in the computer 105 of a first vehicle 101 for receiving permission from a second vehicle 102 for the first vehicle 101 to change lanes.

The process 400 begins in a block 405, in which the computer 105 of the first vehicle 101 determines if a lane change trigger is detected, e.g., in a manner as described above in reference to the process 300. Further, in one implementation a lane change trigger may be alternatively or additionally determined according to user input to the HMI 120, e.g., a user could utter a voice command or the like indicating a desire to change lanes. If the computer 105 of the first vehicle 101 fails to determine a lane change trigger, the process 400 proceeds to a block 450, described below. If a lane change trigger is detected, a block 410 is executed next.

In the block 410, the first vehicle 101 activates a signal. As described above, the signal may take any suitable form. For example, the first vehicle 101 may activate a visual signal that is a pattern in a turn signal 135 or headlights 140, e.g., flashing headlights. The visual signal may indicate that the first vehicle 101 is requesting to change to a specific lane of travel, e.g., on a multi-state highway, in addition to simply indicating a request to change lanes. Alternatively or additionally to visual signals, the first vehicle 101 may change its velocity or path of travel in a manner that may indicate a request to change lanes. For example, the first vehicle 101 may increase its change of velocity rate A and veer slightly into an adjoining lane. The signal may be activated by the occupant of the first vehicle 101 using, e.g., the HMI 120.

Next, in a block 415, the first vehicle 101 detects, e.g., as described above, the signal, e.g., a visual signal, change of velocity rate A, etc., of the first vehicle 101.

Next, in a block 420, the first vehicle 101 interprets and/or decodes the signal of the first vehicle 101 detected in the block 415, e.g., as described above. For example, the computer 105 of the first vehicle 101 may decode a visual signal. The computer 105 of the first vehicle 101 may receive at least one of a combination of visual signals received by the sensors 115 of the first vehicle 101 and/or of kinematic data.

Following the block 420, in a block 425, the computer 105 of the first vehicle 101 uses the evaluation of the block 420 to determine whether the first vehicle 101 is requesting to change lanes. The HMI 120 may give the status of the lane change and/or prompt the occupant of the first vehicle 101 that the computer 105 determined that the first vehicle 101 intends to change lanes, for example. The HMI 120 may prompt the occupant to confirm or modify the lane change. If the computer 105 of the first vehicle 101 determines that the first vehicle 101 intends to change lanes, then the process 400 proceeds to a block 430. However, if the computer 105 of the first vehicle 101 determines that the first vehicle 101 does not request to change lanes, then the process 400 proceeds to the block 450.

If the computer 105 of the first vehicle 101 determines that the first vehicle 101 intends to change lanes, the first vehicle 101, in the block 430, identifies the second vehicle 102 from which to request permission. The manner in which the first vehicle 101 identifies the second vehicle 102 is identical in process 400 and in process 300.

Next, in a block 435, the first vehicle 101, sends a message requesting permission to change lanes to the second vehicle 102. The message may be communicated by the communications device 110 using any suitable protocol, as described above. For example, the first vehicle 101 may send the message to the second vehicle 102 requesting the lane change using any protocol of Dedicated Short Range Communication (DSRC), cellular modem, and short-range radio frequency, etc. The message may also be communicated from the first vehicle 101 to the second vehicle 102 in any suitable manner, such as by a visual signal as described above, which may trigger the beginning of the process 300. That is, the process 300 may proceed in the process 400, from the block 435 to a block 440 to a block 445, for example.

Following the block 435, in the block 440, the first vehicle 101 determines if it has received permission to change lanes from the second vehicle 102. The first vehicle 101 computer 105 uses the evaluation of the block 435 to determine whether the second vehicle 102 has given the permission to change lanes. If the computer 105 of the first vehicle 101 determines that the second vehicle 102 has given the first vehicle 101 permission to change lanes, then the process 400 proceeds to the block 445. However, if the computer 105 of the first vehicle 101 determines that the second vehicle 102 denied permission for the first vehicle 101 to change lanes, then the process 400 proceeds to the block 450.

If the computer 105 of the first vehicle 101 determines that the second vehicle 102 has given the first vehicle 101 permission to change lanes, the first vehicle 101, in the block 445, actuates the lane change. For example, the computer 105 may provide instructions to one or more electronic control units (ECUs) in the vehicle 101 to actuate one or more of steering, throttle, etc., to achieve the lane-change. During the lane change, the HMI 120 may display the status or progress of the lane change. The HMI 120 may prompt the occupant and receive input governing parameters of the lane change, e.g., the HMI 120 may allow the occupant to adjust the speed at which the first vehicle 101 actuates the lane change, the HMI 120 may allow the occupant to cancel the lane change, etc.

Following either the block 405 or the block 425 or the block 440, the computer 105 determines in the block 450 whether the process 400 should continue. For example, the process 400 may end if the occupant of the first vehicle 101 turns off the function of the herein described lane change negotiation, if the vehicle is switched off, etc. In any case, if the process 400 should not continue the process 400 ends following the block 450. Otherwise, the process 400 returns to the block 405.

Computing devices such as those discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited, to, non-volatile media, volatile media, etc. Non-volatile media include, for example, optical or magnetic disks and other persistent memory, Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc, described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising:
   a first vehicle sensor; and
   a first vehicle computer comprising a processor and a memory, the memory storing instructions executable by the processor to:
   send a request for permission to change lanes to a second vehicle;
   receive data from the first vehicle sensor indicating at least one response signal from the second vehicle;
   determine that the signal is a permission for the first vehicle to change lanes; and
   actuate a change of lane of travel of the first vehicle.

2. The system of claim 1, wherein the computer is further programmed to actuate a signaling mechanism to transmit the request for permission to the second vehicle.

3. The system of claim 1, wherein the computer is further programmed to generate the request for permission when a speed of the second vehicle is within a predetermined threshold of a speed of the first vehicle.

4. The system of claim 1, wherein the signal includes a rate of change of speed of the second vehicle.

5. The system of claim 1, wherein the first vehicle sensor is a camera.

6. The system of claim 1, wherein the signal includes at least one of a turn signal and flashing headlights.

7. The system of claim 6, wherein the signal includes a combination of at least two of the turn signal, flashing headlights, a change in velocity, and a change in path of travel of at least one of the first vehicle and the second vehicle.

8. The system of claim 7, wherein the computer is further programmed to identify, from a plurality of lanes, a target lane into which to change the first vehicle's lane of travel based on the combination.

9. The system of claim 1, further comprising a first vehicle human machine interface communicatively coupled to the computer, the computer being further programmed to receive input, via the human machine interface, to change the first vehicle's lane of travel.

10. The system of claim 9, the computer being further programmed to provide an instruction, via a first vehicle network, to at least one electronic control unit to actuate the change of lane of travel.

11. A system, comprising:
    a first vehicle sensor; and
    a first vehicle computer comprising a processor and a memory, the memory storing instructions executable by the processor to:
    receive data from the first vehicle sensor indicating at least one signal from a second vehicle;
    determine that the detected signal is a request for permission for the second vehicle to change lanes; and
    provide a response to the request for permission for the second vehicle to change lanes to the second vehicle.

12. The system of claim 11, wherein providing the response to the request includes determining whether a distance of the second vehicle from a third vehicle exceeds a predetermined threshold.

13. The system of claim 11, wherein providing the response to the request includes determining whether a difference in speed between the first vehicle and the second vehicle exceeds a predetermined threshold.

14. The system of claim 11, wherein the response to the request for permission includes a change of speed of the first vehicle.

15. The system of claim 11, wherein the first vehicle sensor is a camera.

16. The system of claim 11, wherein the signal includes at least one of a turn signal and flashing headlights.

17. The system of claim 11, wherein the signal includes a combination of at least two of a turn signal, the flashing light, a change in velocity, and a change in path of travel of at least one of the first vehicle and the second vehicle.

18. The system of claim 11, further comprising a second vehicle computer programmed to actuate a signaling mechanism to transmit the request for the permission to the first vehicle.

19. The system of claim 11, further comprising a second vehicle computer programmed to provide an instruction, via a second vehicle network, to at least one electronic control unit to actuate the change of lane of travel.

20. The system of claim 11, wherein the first vehicle computer is programmed to provide the response to the request via one of short-range radio frequency, cellular modem, vehicle-to-vehicle communications, and dedicated short-range communications.

* * * * *